United States Patent
Shan (10) Patent No.: US 12,439,489 B2
(45) Date of Patent: Oct. 7, 2025

(54) PLANT GROWTH SYSTEM

(71) Applicant: LED Smart Inc., Surrey (CA)

(72) Inventor: Xinxin Shan, Surrey (CA)

(73) Assignee: LED Smart Inc., Surrey (CA)

( * ) Notice: Subject to any disclaimer, the term of this patent is extended or adjusted under 35 U.S.C. 154(b) by 374 days.

(21) Appl. No.: 18/056,206

(22) Filed: Nov. 16, 2022

(65) Prior Publication Data

US 2023/0164891 A1 May 25, 2023

(30) Foreign Application Priority Data

Nov. 23, 2021 (CA) .................................. CA 3139742

(51) Int. Cl.
  *H05B 45/12* (2020.01)
  *A01G 7/04* (2006.01)
  *H05B 45/22* (2020.01)
  *H05B 47/16* (2020.01)

(52) U.S. Cl.
  CPC ............. *H05B 45/12* (2020.01); *A01G 7/045* (2013.01); *H05B 45/22* (2020.01); *H05B 47/16* (2020.01)

(58) Field of Classification Search
  CPC ........ H05B 45/12; H05B 45/22; H05B 47/16; H05B 47/19; H05B 47/11; A01G 7/045; Y02B 20/40
  See application file for complete search history.

(56) References Cited

U.S. PATENT DOCUMENTS

| | | |
|---|---|---|
| 5,956,897 A | 9/1999 | Takashima |
| 6,725,598 B2 | 4/2004 | Yoneda et al. |
| 6,921,182 B2 | 7/2005 | Anderson, Jr. et al. |
| 8,074,397 B2 | 12/2011 | Yoneda et al. |
| 10,187,953 B1 * | 1/2019 | Dutta ..................... A01N 25/00 |
| 10,349,500 B2 | 7/2019 | Amrine et al. |
| 10,863,598 B2 | 12/2020 | Eisele |
| 2007/0157515 A1 | 7/2007 | Bula |
| 2007/0289207 A1 | 12/2007 | May et al. |

(Continued)

FOREIGN PATENT DOCUMENTS

| | | |
|---|---|---|
| CA | 2705648 | 11/2010 |
| CA | 2752594 | 12/2012 |

(Continued)

OTHER PUBLICATIONS

Folta, K.M., et al.,Light as a Growth Regulator: Controlling Plant Biology With Narrow-Bandwidth Solid-State Lighting Systems, HortScience vol. 43(7); Dec. 2008; pp. 1957-1964.

(Continued)

*Primary Examiner* — Abdullah A Riyami
*Assistant Examiner* — Syed M Kaiser
(74) *Attorney, Agent, or Firm* — CHRISTENSEN O'CONNOR JOHNSON KINDNESS PLLC (57) ABSTRACT

A networked LED lighting system for illuminating plants uses LEDs of different colors each at a respective pre-selected power level, for example corresponding to a power level at which maximum efficiency is achieved, and controlling color ratios and total daily intensity by turning LEDs off or on as needed. To improve longevity of the LEDs, the turning off and on of the LEDs can occur at low frequencies, be implemented in the LED drivers as opposed to switching off the power, and can include a gradual transition between on and off states.

17 Claims, 4 Drawing Sheets

(56) References Cited

U.S. PATENT DOCUMENTS

| | | | |
|---|---|---|---|
| 2009/0025287 A1 | 1/2009 | Lee | |
| 2009/0031622 A1 | 2/2009 | Emoto | |
| 2010/0020536 A1 | 1/2010 | Bafetti et al. | |
| 2010/0115830 A1 | 5/2010 | Dube | |
| 2010/0289411 A1 | 11/2010 | Smits et al. | |
| 2013/0162147 A1* | 6/2013 | Jiang | A01G 9/249 315/154 |
| 2018/0129121 A1* | 5/2018 | Van Der Sijde | H05B 45/20 |
| 2020/0184153 A1* | 6/2020 | Bongartz | A01G 9/249 |
| 2020/0256841 A1* | 8/2020 | Urschel | G01N 21/64 |

FOREIGN PATENT DOCUMENTS

| | | |
|---|---|---|
| WO | 2005041633 | 5/2005 |
| WO | 2008068699 | 6/2008 |
| WO | 2019/023800 | 2/2019 |

OTHER PUBLICATIONS

Article from www.philips.com/horti: Be in Control of Your Profits; Sep. 2009 [retrieved Jan. 2014] pp. 1-4.
Yavari, N., et al, The Effect of Light Quality on Plant Physiology, Photosynthetic, and Stress Response in *Arabidopsis thaliana* Leaves; Research Article; PLOS One; Mar. 4, 2021; pp. 1-19.
Canadian Office Action mailed May 1, 2024, issued in corresponding Canadian Application No. 3,139,742, filed Nov. 23, 2021, 4 pages.

* cited by examiner

PLANT GROWTH SYSTEM

TECHNICAL FIELD

Automatic provision of photosynthetic active radiation (PAR) to plants.

BACKGROUND

Among various environmental factors, light is one of the most important variables affecting photosynthesis as well as plant growth and development.

Traditionally a greenhouse uses fixed colored lights as the primary lights or supplemental lights. The operators turn on the lights or turn off the lights either relying on the experience or depending on a photon meter reading. The method to turn on or turn off the lights is simply switch on or switch off the power supply of the lights. These operations can produce a big surge voltage and may cause the damage to the lights or other devices. Also, the controlling methods involves human interventions every day, and the system may not provide suitable number and colored photons to the plants.

Within the context of horticultural lighting, several parameters are commonly used to describe photosynthetic active radiation (PAR) and related activities. Three important metrics commonly used to describe 1) PAR include photosynthetic photon flux density (PPFD), measured in micro-moles irradiated photons in the PAR range of 400-700 nm per square meter per second; 2) the daily light interval (DLI), measured in irradiated photons per day in moles per square meter; 3) Photosynthetic Photon Efficacy, the PAR photon output of a light source (measured in micromoles per second or µmol/s) divided by the input power (Watt). PPE is used to measure the electrical to optical efficiency of a lighting system.

For a plant in a plant factory where the LED lights are the primary lights, the time length in a day may not equal to 24 hours. Some plants may have a shorter daily cycle, for example, lighting for 8 hours and sleeping for 4 hours as a day. In this case, the term "day" or "daily" are taken to refer to these alternate lighting periods.

In the case of constant intensity and a specified number of hours of lighting per day, the relationship between DLI and PPFD can be written as:

DLI=PPFD×lighting hours per day×(3600/1000,000).

The daily photon numbers per square meter (DLI) indicates the daily photons a plant need. This number can be obtained through experiments and is a key parameter to influence the plant growing. A formula can set the daily amount of this value. A PAR sensor can measure the photon number intensity in real time.

SUMMARY

An LED lighting system may be operated to illuminate plants. Plural LEDs of the LED lighting system may be provided arranged in groups of LEDs, each group of LEDs controlled by a respective LED driver, the groups of LEDs including at least one first wavelength group of LEDs emitting light predominantly at a first wavelength and a second wavelength group of LEDs emitting light predominantly at a second wavelength. In a processor of the LED lighting system, a relative uptime of the at least one first wavelength group of LEDs and the at least one second wavelength group of LEDs may be determined in order to provide a desired ratio of the light at the first wavelength to the light at the second wavelength over a period of time. This can include, for example, a central portion of the central processing system providing an intensity ratio or other information from which a processor local to an LED light calculates the relative uptime. The respective LED driver controlling the at least one first wavelength group of LEDs is then instructed, for example by the central processing system or local processor, to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime, the active period and the inactive period being sufficiently long to be perceptible to a human.

In various embodiments, there may be included any one or more of the following features: the first wavelength may correspond to red light and the second wavelength to blue light, or the second wavelength may correspond to blue light and the first wavelength to red light. In response to determining that a Daily Light Interval (DLI) corresponding to a total amount of photosynthetic active radiation (PAR) to be received in a photosynthetic active period has been reached, the central processing system may instruct the respective LED drivers of the groups of LEDs to turn off the plural LEDs of the LED lighting system. The active period and inactive period together form a combined period of greater than 1 second, 10 seconds, 1 minute or 5 minutes. Before determining the relative uptime, an LED driver of the LED lighting system may be configured to set a maximum power level of a group of LEDs controlled by the LED driver according to a maximum efficiency power level of the group of LEDs. This may be carried out before installation of the group of LEDs in the lighting system. Between the active period and the inactive period may be a transition period in which a power level supplied to the at least one group of first wavelength LEDs is gradually changed by the respective LED driver controlling the at least one first wavelength group of LEDs, the transition period lasting at least 1 second.

There also may be provided an LED lighting system to illuminate plants. The system may include plural LEDs of the LED lighting system arranged in groups of LEDs, each group of LEDs controlled by a respective LED driver, the groups of LEDs including at least one first wavelength group of LEDs emitting light predominantly at a first wavelength and a second wavelength group of LEDs emitting light predominantly at a second wavelength. The respective LED driver controlling the at least one first wavelength group of LEDs, in order to provide a desired ratio of the light at the first wavelength to the light at the second wavelength over the period of time, may be configured to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime, the active period and the inactive period being sufficiently long to be perceptible to a human. The first wavelength may correspond to red light and the second wavelength to blue light, or the second wavelength to blue light and the first wavelength to red light. The LED lighting system may also include a central processing system configured to, in response to determining that a Daily Light Interval (DLI)

corresponding to a total amount of photosynthetic active radiation (PAR) to be received in a photosynthetic active period has been reached, instructing the respective LED drivers of the groups of LEDs to turn off the plural LEDs of the LED lighting system. The active period and inactive period may together form a combined period of greater than 1 second, greater than 10 seconds, greater than 1 minute, or greater than 5 minutes. An LED driver of the LED lighting system may be configured to set a maximum power level of a group of LEDs controlled by the LED driver according to a maximum efficiency power level of the group of LEDs. The LED driver of the LED lighting system may be configured to set the maximum power level of a group of LEDs controlled by the LED driver according to a maximum efficiency power level of the group of LEDs before installation of the group of LEDs in the lighting system. The active period and the inactive period may be a transition period in which a power level supplied to the at least one group of first wavelength LEDs is gradually changed by the respective LED driver controlling the at least one first wavelength group of LEDs, the transition period lasting at least 1 second. These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
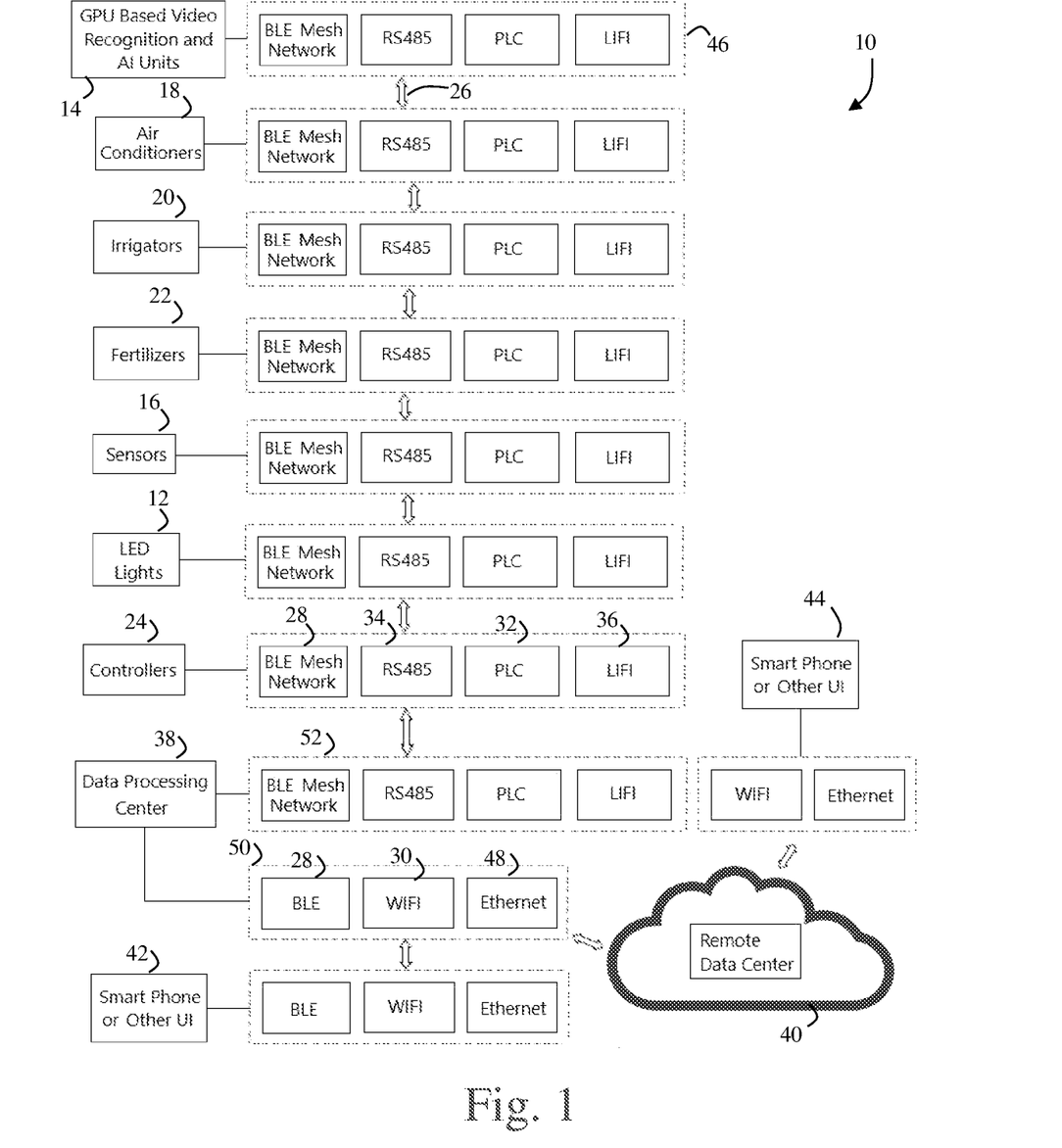
FIG. 1 is a schematic diagram showing an exemplary networked smart horticultural system.

As illustrated in FIG. 1, a proposed networked plant growing system 10 includes lights 12 to provide the photons to plants; environmental control devices 18 to control the temperature, humidity, $CO_2$ to the plants; irrigating 20 and fertilizing 22 devices to provide the water and nutrition to the plants. The system also contains various sensors 16 to monitor the number and color of photons, to monitor the environment and the health of the plants. A novel photon intensity adjustment method and the photon spectral power distribution adjustment method, illustrated in FIGS. 2 and 3, may be used to meet the plants' growth needs and keep the whole system at its peak photosynthetic performance.

LED lighting, in additional to the photosynthesis, can also act as the growing signals. the proposed networked plant growing system 10 may contains several different types of colored LEDs in the Photosynthetic Active Radiation (PAR) area (400 nm-700 nm), as well as additional UV and Far-Red LEDs. The combinations of these LEDs may be used to guide the plants to grow strongly and healthily.

The system and method of a plant growth system may contain plural numbers of smart lights, photosynthetic active radiation sensors, other sensors, and control units. All of these components may be networked together through Bluetooth™ mesh networks, Wi-Fi™ networks, power line communication networks, wire-line networks, or LiFi networks, or the combinations of the above networks, depending on the appropriateness of the components.

The intelligent plant growth system 10 is proposed for growing one or more plants in a smart device-controlled environment. The system may include for example lights 12, machine vision devices 14 for example including video cameras and AI systems, here shown as GPU based, other sensors 16, $CO_2$ sources (not shown), air conditioning devices 18, irrigating 20 and fertilizing 22 devices and human-interactive control boxes 24. All such devices may be interconnected via one or more networks 26, via at least one network interface 46. The at least one network interface 46 may be configured to connect to one or more of the networks 26, such as for example Bluetooth™ mesh networks 28, Wi-Fi™ networks 30, power line communication networks 32, wire-line networks 34, or LiFi (a wireless communication technology which utilizes light to transmit data and position between devices) networks 36. The components within this system may be divided into zones and a group of components within a zone can be controlled separately from groups in other zones. A local control computer, indicated in FIG. 1 as a Data Processing Center 38, can work as an independent control center, or it can be connected to a cloud-based data exchange and communication center, for example a cloud-based server indicated in FIG. 1 as a Remote Data Center 40, over the Internet for sharing and distributing of formulas, and other AI based data collecting and controlling. The local control and data center 38 may be configured to allow user access via Bluetooth™ 28, Wi-Fi™ 30 or Ethernet 48 with an app on a smart phone/pad 42, or through a networked computer terminal (not shown), for example using a local area network such as networks 26, even when the local control and data center 38 works without Internet access. Where internet access is available, the local control and data center 38 may be configured to allow access via the internet, for example via the Remote Data Center 40 as shown for remote accessing user device 44 in FIG. 1.

The smart devices may control the environment according to a formula, for example from a set of formulas saved at the local control and data center 38 or Remote Data Center 40. The formulas may contain the doses and spectral power distributions of the light a plant needs per day at its different growing stages. The data center may take in lighting intensities, for example in a fixed interval, from intensity sensors of sensors 16 and may decide an illumination time per day according to the dose value from the formula and the sensed lighting intensities. The spectral power distribution of a light may be adjusted by setting different intensities for different selected types of LEDs. A set of spectral power distributions can be preset in the lab at the manufacturing time or dynamically adjusted with the help of the spectral sensors. Usually, the highest efficiency of one type of LEDs can be achieved by optimizing the driver components of these LEDs. Changing the spectral power distributions can be implemented by changing the intensity ratios of these LEDs. However, changing the intensity of one type of LEDs may greatly affect the efficiency of the LEDs and hence the efficiency of the whole system. An embodiment proposes a new method to realize different spectral power distributions: chopping the illumination time of each selected type of LEDs rather than dimming so that each type of LED when on maintains a pre-selected intensity, for example corresponding to an intensity level at which the type of LEDs is at its peak value.

In the system structure, shown in FIG. 1, there may be at least one micro-processor and at least one network interface on each light 12, sensor 16, or other device. The network can be one of the Bluetooth™ mesh 28, Power Line Communication 32, Wi-Fi™ 30, LiFi 36, wireline 34 (e.g. RS485), or combinations of these networks. In an embodiment, the software on each of micro-processor can automatically find the nearby nodes and form one or more networks.

If the network is a mesh network, the micro-controller on one node can receive a package and check the destination of this package. If the final destination is not this node, then the node will forward the package to its neighbor nodes.

If the network is a bus structured network, such as power line communication 32 and RS485 34 networks, a package from one node can automatically reach to all the same networked nodes. Hence there is no need for package forward.

If there are two network interfaces on one node, the node may forward a package to all its network interfaces if the package is not for this node.

There is a local data and control center 38 within the networks. In the embodiment shown there are at least two network interfaces 50 and 52 on the local data and control center: A first interface 50, for example Wi-Fi™ 30 or Bluetooth™ 28 or Ethernet 48 interface is used for connection to one or more user device UI 42, 44 directly or through a cloud based remote data center; a second interface 52, for example Bluetooth™ 28 mesh, power line communication 32, Wi-Fi™ 30, LiFi 36, or Wire-line network 34 interface is used to connect with other local devices, such as lights 12, sensors 16 and controllers 24. Depending on the embodiment, a single network interface, such as Wi-Fi™ 30 or Bluetooth™ mesh 28, may be used for both the user device 42 and other devices.

In an embodiment the main functions for the local data and control center are: 1) to receive the commands from a user, either via a local networked UI directly or via the remote data centers; 2) to process the commands and to send the commands to the corresponding nodes; 3) to fetch the sensors data either required by a user, or by the local data center itself; 4) to process the sensors data and to generate the commands to the corresponding nodes either using pre-setting rules or through AI learning.

Figure 4:
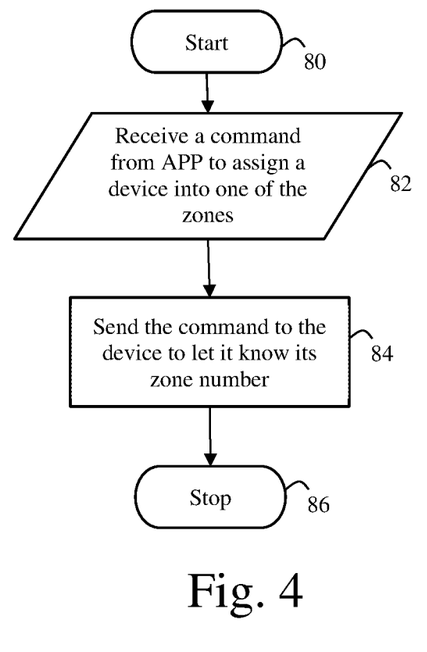
FIG. 4 is a flow chart illustrating an exemplary method to divide the devices of the networked smart horticultural system to different zones

The user commands may include the zoning command illustrated in FIG. 4. The data center should be able to remember all the zoning information and deal with these packages accordingly. The data center can let a controller know which devices are under the controller's control so that the command from the controller can only operate these devices.

Each of the other devices inside the networks contains the device hardware, a microcontroller, and the associated network interface. For example, the photon sensor includes the photon sensor hardware, a Bluetooth™ mesh network enabled microprocessor and the Bluetooth™ mesh network interface. The microprocessor is responsible to find and attached to a network via its network interface. After the network is established, the microprocessor receives the commands via the network interface; process the commands; fetch data from the sensor hardware; and send the data out.

Another example is the light. A light contains one or more LED panels, one or more LED drivers, a Bluetooth™ mesh enabled microprocessor and the Bluetooth™ mesh network interface. The microprocessor is responsible to find and attach to a network via its network interface. After the network is established, the microprocessor receives the commands via the network interface; process the commands; light up the LEDs through the drivers.

A local controller may, for example, work like a switch. The local controller may include a microprocessor, network interface, input keypad and a displayer. A local controller may be zoned by the local data center so that it can only operate the devices within the assigned zone.

The GPU based video recognition and AI unit may be used to capture the videos of the plants; to process the video to recognize the plant type and growing stage; to send the information to the local data center. This unit can also be used to recognize a human being; calculate the moving speed and direction and send the information to the local data center. The local data center can adjust some operations accordingly, e.g. light up the road in front of the person; temporary suspend the irrigating and fertilizing for the area near the person.

Figure 2:
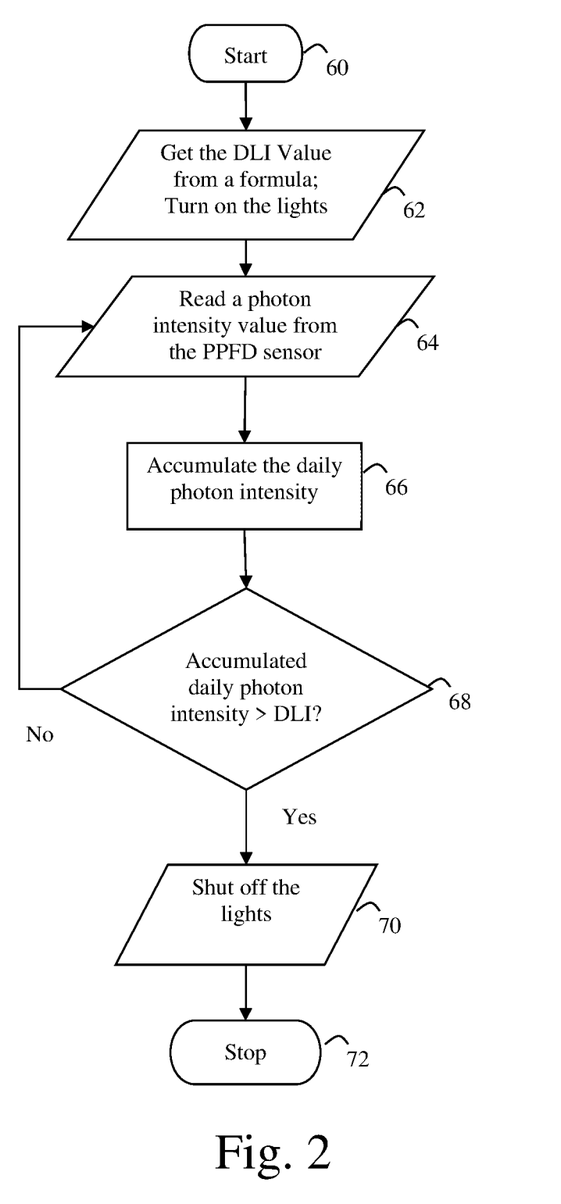
FIG. 2 is a flow chart illustrating an exemplary method to automatically control a total amount of light received by plants in a period of time.

The local data center can obtain the DLI value each day either from a formula 38 or learn from the AI unit 14 or an AI in Remote Data Center 40. The local data center 38 can then automatically control the lights 12 with the help of one or more photosynthetic photon flux density (PPFD) sensors of sensors 16. An exemplary method is shown in FIG. 2, but is not to be limited to what is shown in this figure. As shown in FIG. 2, from start 60 the local data center 38 proceeds to obtain a Daily Light Interval (DLI) from a formula in step 62. The DLI corresponds to a total amount of photosynthetic active radiation (PAR) to be received in a photosynthetic active period, which may be for example a day, or another amount of time where a plant is to be given a different light/dark cycle. The local data center 38 then proceeds to determine that the total amount of PAR to be received in the photosynthetic active period has been reached. Exemplary steps for making this determination are shown in FIG. 2. In step 64, the local data center 38 reads a photon intensity value from a PPFD sensor, and in step 66 the local data center 38 accumulates the photon intensity. In step 68, it determines if the accumulated daily photon intensity has reached the total amount (DLI) to be received. If not, steps 64, 66 and 68 are repeated until it is determined that the accumulated daily photon intensity has reached the total amount (DLI) to be received. In response, the central processing system 38 shuts off the lights 12 in step 70 and the method ends at stop 72. The central processing system 38 may then turn on the lights 12 on a subsequent day at a time according to the formula or AI (step not shown).

The method shown in FIG. 2 allows the lighting time to be increased if the DLI setting has not been reached, or decreased if it is reached early, for example due to sunlight. Thus, our lights can work as the light compensators. The emphasis is on DLI, i.e. total photons per day, rather than intensity. Stable intensity is generally preferred by human beings, but is not required for plants. When on, LEDs may operate at a pre-selected intensity level, which may be selected for example based on efficiency. In particular, the pre-selected intensity may be an intensity at which the LEDs operate at maximum efficiency.

When the central processing system 38 turns off lights 12 it may do so in a manner different from how a person would shut off lights manually. When a person shuts down lights manually, they will typically operate a power switch turning off power to the lights causing the LED drivers and LEDs to be abruptly deprived of power, which may affect longevity of the lights. In contrast, the central processing system may instruct the respective LED drivers of the groups of LEDs to turn off the plural LEDs of the LED lighting system, the LED drivers still having access to power as the lights turn off. The LED drivers may be instructed directly from the local data center 38, or for example via a processor in each light unit 12.

In an embodiment the local data center 38 sends signals to all the lights to let them go into sleep mode. Inside each lamp may be one or more LED drivers and a processor which continues to have access to power. Once the processor goes to the sleep mode by either receiving off signals, or by internal events (such as timer off period), the processor will gradually lower down the driver outputs for a transition period until an off state is reached where there is no power to the LEDs. When the processor receives back-on or set new power signals, it will gradually increase the driver outputs over a same or different length transition period until the power to the LEDs has reached an intended level, which may be a pre-selected amount of power, for example to maximize efficiency. This gradual turning on or off can improve longevity of the LEDs. The signals to turn off the LEDs may be applied to all LEDs or to LEDs of specific colors.

The above method may be of particular use if the lights are used as the supplemental lighting where the sunlight is main light. Shutting off the lights can avoid burning out the plants due to excessive exposure. In an embodiment, the control algorithm is run by the local data center 38, which controls many networked lamps. Lamps and sensors may be separated into zones which are controlled separately, in this and in any control methods disclosed. The method to divide the lights and other devices into zones and devices in each zone are controlled independently to those in the other zones.

A user can use an app to group the devices into different zones. One device can be assigned into different zones. Devices in each zone may be controlled independently from devices in other zones. For example, in an embodiment a local controller such as a control box with a CPU, network interface and control buttons may only be able to control devices within the same zone. A method of assigning devices to zones is shown in FIG. 4, but is not limited by this Figure. In FIG. 4, from start 80 the local data center 38 receives in step 82 a command from the app to assign a device to one of the zones. In step 84, the local data center 38 sends a command to the device to let it know its zone number, and the method then ends at step 86. For example, a zone may include lights and sensors for a plant or set of plants.

In an embodiment, a light 12 has a processor controlling up to 6 LED drivers. Each driver drivers a type of certain colored LEDs. The different amplitudes of these 6 LED drivers generate different combinations of output colors or spectrums. We can pre-set a series of red to blue ratios with the combinations of the different amplitudes of the drivers by measuring light outputs, for example using a spectroradiometer integrating sphere system in a lab. This spectroradiometer integrating sphere system can also be used to measure the electric to optic convert efficiency of each driver against its output amplitudes.

The driver may optionally be adjusted so that a request for 100% amplitude sets the amplitude of the driver output to a pre-selected amplitude. With the help of this spectroradiometer integrating sphere system, the maximum efficiency amplitude can be found and the 100% amplitude may be selected to be at or near the maximum efficiency amplitude. The maximum efficiency amplitude may for example by measured for a hardware driver and the LEDs strip it drives, or estimated. In an embodiment, the LED driver is given a hardware modification setting the maximum output to substantially the maximum efficiency value. For example, if we measured that at 900 mA, the red LEDs have the maximum efficiency, we then modify the hardware to let the red LED driver to output maximum 900 mA current. The software can adjust the output current ranging from 0%-0 mA to 100%-900 mA. This hardware modification may not be able to obtain the exact value, because the adjustment may be carried out using a resistor which may be selected from a set of resistors with discrete values. However, the maximum value set may still be substantially the maximum efficiency value.

The spectral power distribution is another important parameter to influence plant growth. A plant usually needs more blueish spectrum at the early growing stage, more reddish spectrum at the growing up stage and even much more reddish at the flowering and fruiting stage. To adjust the spectral power distribution, people usually lower down the brightness of some colored components and increase up the brightness of other colored components. However, a LED driver usually can only achieve the maximum efficiency at a fixed power level. The disadvantage of this method is the reduced efficiency (PPE) of some LEDs, and hence the efficiency of the whole system is reduced.

Therefore, a different spectral power distribution adjustment method is proposed. Rather than changing the power of the selected LEDs, the novel method changes the lighting on/off time of the selected LEDs within a certain time period. Hence the total photon numbers or dose of the selected LEDs within the same time period equals to the photo numbers using general dimming method. But the novel method always keeps the system electrical to optical efficiency at the maximum level.

Figure 3:
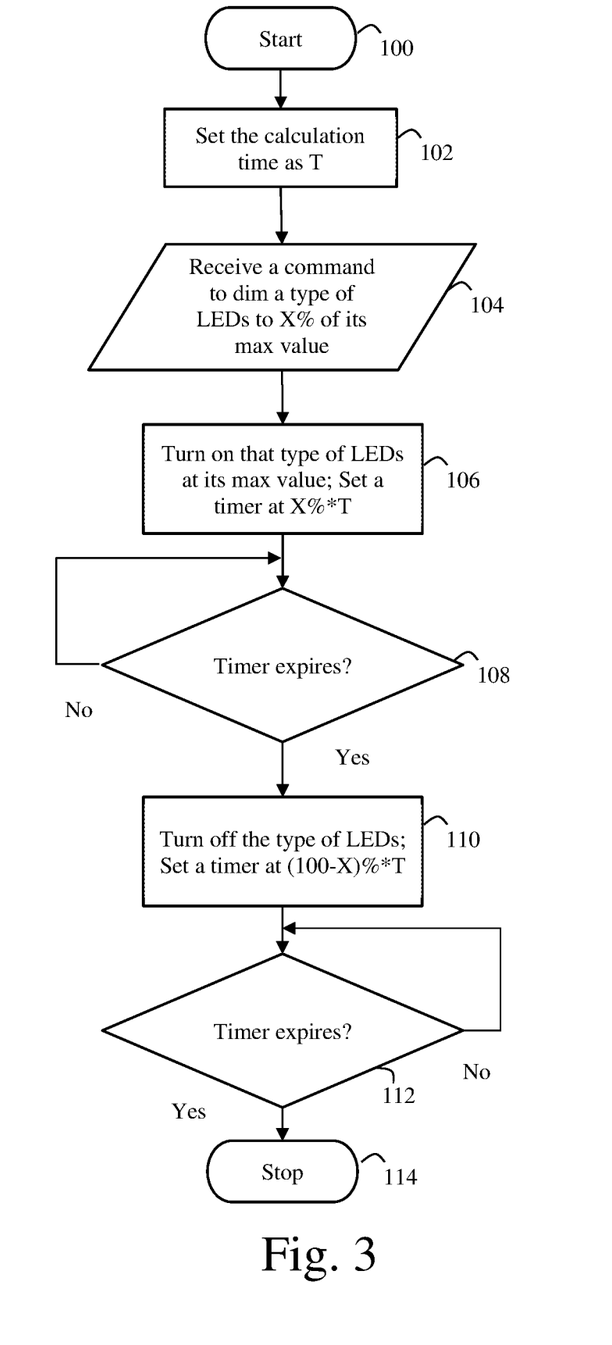
FIG. 3 is a flow chart illustrating an exemplary method of adjusting a spectral power distribution.

The local data center may adjust the spectral power distribution either from a formula or from the AI unit. The procedure is shown in FIG. 3, but not be limited by this figure. If a formula or AI instruction would cause an amplitude of a driver to not be at a desired pre-selected amplitude, for example its maximum electric to optic convert efficiency amplitude, the processor can let the driver work part of the time at the pre-selected amplitude and part of the time off, so that within a certain time, the driven LEDs generating the same number of photons as if it were working continuously at the amplitude requested in the formula. Where the pre-selected amplitude is a maximum efficiency amplitude, overall electrical energy will be saved.

FIG. 3 illustrates an exemplary method of controlling the spectrum of light used to illuminate plants. The method may be applied to an LED lighting system including plural LEDs arranged in groups of LEDs, each group of LEDs controlled by a respective LED driver. LED lighting system may include at least one first wavelength group of LEDs emitting light predominantly at a first wavelength and a second wavelength group of LEDs emitting light predominantly at a second wavelength. The LED lighting system may include a central processing system 38, which may determine a relative uptime of the at least one first wavelength group of LEDs and the at least one second wavelength group of LEDs in order to provide a desired ratio of the light at the first wavelength to the light at the second wavelength over a period of time. The central processing system may then instruct, for example directly or via a processor, the respective LED driver controlling the at least one first wavelength group of LEDs to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime. The second wavelength LEDs may be operated continuously, or also operated part of the time.

In a specific example illustrated in FIG. 3, from start 100 a period T may be set in step 102. The desired ratio of light may be implemented through an instruction 104 to dim the average light output of a type of LEDs to a percentage of a set output value, for example as shown in FIG. 3 the maximum output of the LEDs. This in turn is implemented in steps 106-114, for example by the LED driver, by operating the LEDs at the set output value for that percentage of the total period T. This can achieve a relative uptime to produce the desired ratio of light by applying this method to one set of LEDs while continuously operating another, or by applying the method to multiple types of LEDs with different percentages as required. In the specific method shown in FIG. 3, in step 106 the type of LEDs is turned on at the set output value for the percentage of the period T. In step 108 a timer is used to check if the percentage of the period T has expired. In step 110, once the timer has expired, the LEDs of the type are turned off. In step 112 a further timer is checked to see if the remaining percentage of the period T has expired, and if it has expired the method ends in step 114. It may then repeat the above steps, for example returning to step 106. Where the method is applied to multiple types of LEDs, each one may use the same period T and start time, resulting in the different types turning on at the same time and off at different times. Different start times and periods may also be used, or different active periods and inactive periods may be different in length even for the same type and average light output of the LEDs. The colored lights adjustment algorithm allows improved, for example maximized, efficiency in different color ratio combinations.

Some LED products conventionally achieve dimming by pulse modulation, for example pulse width modulation or pulse frequency modulation. These typically operate at frequencies of for example 1-2 kHz, such that a person would not perceive the pulses separately. In the embodiments disclosed here, the lighting is for plants, which do not need rapidly pulsed light. Thus, the active period and the inactive period may be sufficiently long to be perceptible to a human. The active and inactive periods may together form a combined period of, for example, greater than 1 second, greater than 10 seconds, greater than 1 minute or greater than 5 minutes.

As disclosed above in relation to turning off the LEDs due to a DLI being reached, the LEDs may turn on and off gradually. This also may be applied to the color ratio control disclosed here. Longer active and inactive periods can reduce the efficiency losses from the transition periods and improve longevity by reducing the number of transitions.

In an example, if a required color combination requires 50% intensity for red light while red LEDs works at the highest efficiency at 100% intensity, we can let the red LEDs work 100% intensity for 5 minutes and off for 5 minutes, so that we can realize the highest efficiency in a 10 minute interval.

It is considered that the red-to-blue ratios are particularly important. Thus, the above method may be applied particularly to red and blue light. Thus, in an example the first wavelength corresponds to red light and the second wavelength corresponds to blue light, or the second wavelength corresponds to blue light and the first wavelength corresponds to red light. The method may also be used to adjust other color ratios, and may be used to adjust more than two color ratios. A set of color ratios may be the same, while the spectrum as a whole is different. It is believed that, for an appropriate set of colors, for example including at least red and blue, a color ratio or set of color ratios, along with intensity, is sufficient even without specifying a complete spectrum. Amber may be an additional color. Additional UV and Far-Red LEDs may also be included as additional colors and can guide the plants to grow sturdily and healthily.

The color ratios and overall uptime may be controlled automatically, for example according to a formula or an AI. The system is an intelligent automatic control system: from a recipe, or by AI, the local data center gets the daily photon numbers, red to blue and/or other color ratios and lighting up time. The local data center then calculates the amplitudes for each driver, and then sends the signals to light up the LEDs. The local data center also monitors the accumulated photo numbers from the photo detector, and dynamically adjusts the amplitudes of each driver, implemented by the drivers via uptime of the LEDs, to make sure the DLI can meet a pre-set value.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of operating an LED lighting system to illuminate plants, the method comprising:
   providing plural LEDs of the LED lighting system arranged in groups of LEDs, each group of LEDs controlled by a respective LED driver, the groups of LEDs including at least one first wavelength group of LEDs emitting light predominantly at a first wavelength and a second wavelength group of LEDs emitting light predominantly at a second wavelength;
   assigning the groups of LEDs and a light sensor into zones;
   in a processor of the LED lighting system, determining a relative uptime of the at least one first wavelength group of LEDs and the at least one second wavelength group of LEDs in order to provide a desired ratio of the light at the first wavelength to the light at the second wavelength over a period of time;
   instructing the respective LED driver controlling the at least one first wavelength group of LEDs to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime, the active period and the inactive period being sufficiently long to be perceptible to a human;
   in response to determining, based on information from the light sensor that a Daily Light Interval (DLI) corresponding to a total amount of photosynthetic active radiation (PAR) to be received in a photosynthetic active period has been reached, the processor instructing the respective LED drivers of the groups of LEDs to turn off the plural LEDs of the LED lighting system, groups of LEDs assigned to different zones being controlled independently, and the determination that the DLI has been reached being made in respect of the zone to which the light sensor is assigned.

2. The method of claim 1 in which the first wavelength corresponds to red light and the second wavelength corresponds to blue light, or the second wavelength corresponds to blue light and the first wavelength corresponds to red light.

3. The method of claim 1 in which the active period and inactive period together form a combined period of greater than 10 seconds, or 1 minutes or 5 minutes.

4. The method of claim 1 further comprising the steps of, before determining the relative uptime, configuring an LED driver of the respective LED drivers of the LED lighting system to set a maximum power level of a group of LEDs controlled by the LED driver according to a maximum efficiency power level of the group of LEDs.

5. The method of claim 4 in which the steps of configuring an LED driver of the LED lighting system to set a maximum power level of a group of LEDs controlled by the LED driver according to a maximum efficiency power level of the group of LEDs are carried out before installation of the group of LEDs in the lighting system.

6. The method of claim 1 in which between the active period and the inactive period is a transition period in which a power level supplied to the at least one group of first wavelength LEDs is gradually changed by the respective LED driver controlling the at least one first wavelength group of LEDs, the transition period lasting at least 1 second.

7. An LED lighting system to illuminate plants, the system comprising:
   plural LEDs of the LED lighting system arranged in groups of LEDs, each group of LEDs controlled by a respective LED driver, the groups of LEDs including at least one first wavelength group of LEDs emitting light predominantly at a first wavelength and a second wavelength group of LEDs emitting light predominantly at a second wavelength;
   the respective LED driver controlling the at least one first wavelength group of LEDs, in order to provide a desired ratio of the light at the first wavelength to the light at the second wavelength over the period of time, being configured to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime, the active period and the inactive period being sufficiently long to be perceptible to a human;
   the groups of LEDs being assigned into zones, groups of LEDs assigned to different zones being controlled independently, and a light sensor being assigned into a zone of the zones; and
   a central processing system configured to instruct the respective LED drivers of a group or groups of LEDs assigned to the zone of the zones to turn off the plural LEDs of the LED lighting system in response to determining that a Daily Light Interval (DLI) corresponding to a total amount of photosynthetic active radiation (PAR) to be received in a photosynthetic active period has been reached based on information from the light sensor and in respect of the zone of the zones to which the light sensor is assigned.

8. The LED lighting system of claim 7 in which the first wavelength corresponds to red light and the second wavelength corresponds to blue light, or the second wavelength corresponds to blue light and the first wavelength corresponds to red light.

9. The LED lighting system of claim 7 in which the active period and inactive period together form a combined period of greater than 10 seconds, or 1 minutes, or 10 minutes.

10. The LED lighting system of claim 7 in which an LED driver of the respective LED drivers of the LED lighting system is configured to set a maximum power level of a group of LEDs controlled by the LED driver according to a maximum efficiency power level of the group of LEDs.

11. The LED lighting system of claim 10 in which the LED driver of the respective LED drivers of the LED lighting system is configured to set the maximum power level of a group of LEDs controlled by the LED driver according to a maximum efficiency power level of the group of LEDs before installation of the group of LEDs in the lighting system.

12. The LED lighting system of claim 7 in which between the active period and the inactive period is a transition period in which a power level supplied to the at least one group of first wavelength LEDs is gradually changed by the respective LED driver controlling the at least one first wavelength group of LEDs, the transition period lasting at least 1 second.

13. An LED lighting system to illuminate plants, the system comprising:
   plural LEDs of the LED lighting system arranged in groups of LEDs, each group of LEDs controlled by a respective LED driver, the groups of LEDs including at least one first wavelength group of LEDs emitting light predominantly at a first wavelength and a second wavelength group of LEDs emitting light predominantly at a second wavelength;
   the respective LED driver controlling the at least one first wavelength group of LEDs, in order to provide a desired ratio of the light at the first wavelength to the light at the second wavelength over the period of time, being configured to activate the at least one first wavelength group of LEDs for an active period and deactivate the at least one group of first wavelength LEDs for an inactive period, the active period and the inactive period being selected to cause the at least one first wavelength group of LEDs and the at least one second wavelength group of LED to have the determined relative uptime, the active period and the inactive period being sufficiently long to be perceptible to a human, and in which between the active period and the inactive period is a transition period in which a power level supplied to the at least one group of first wavelength LEDs is gradually changed by the respective LED driver controlling the at least one first wavelength group of LEDs, the transition period lasting at least 1 second.

14. The LED lighting system of claim 13 in which the first wavelength corresponds to red light and the second wavelength corresponds to blue light, or the second wavelength corresponds to blue light and the first wavelength corresponds to red light.

15. The LED lighting system of claim 13 in which the active period and inactive period together form a combined period of greater than 10 seconds, or 1 minutes, or 10 minutes.

16. The LED lighting system of claim 13 in which an LED driver of the respective LED drivers of the LED lighting system is configured to set a maximum power level of a group of LEDs controlled by the LED driver according to a maximum efficiency power level of the group of LEDs.

17. The LED lighting system of claim 16 in which the LED driver of the respective LED drivers of the LED lighting system is configured to set the maximum power level of a group of LEDs controlled by the LED driver according to a maximum efficiency power level of the group of LEDs before installation of the group of LEDs in the lighting system.

* * * * *